May 10, 1932. I. JACOBS 1,857,309
FASTENER
Filed June 19, 1929
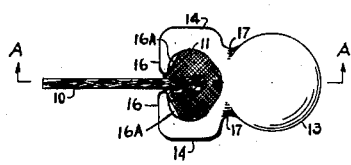
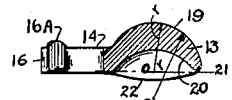
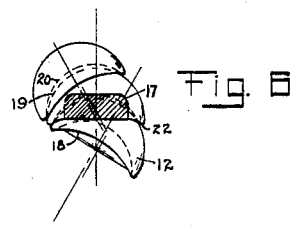
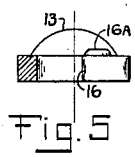
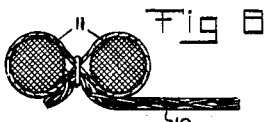
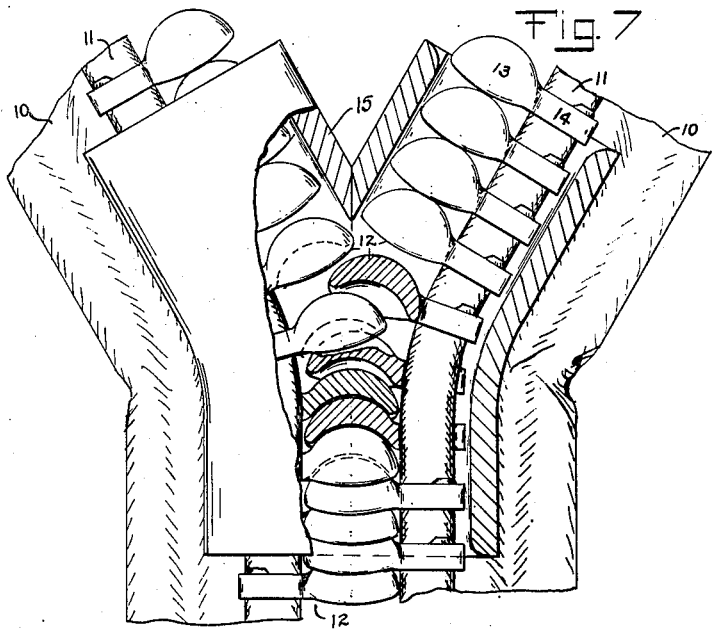
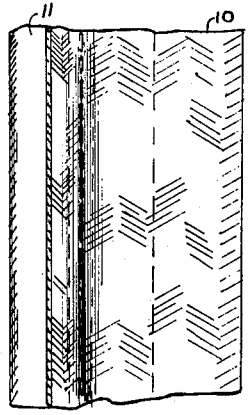
Isidor Jacobs, INVENTOR.
BY *Thayer a'field*
ATTORNEYS.

Patented May 10, 1932

1,857,309

UNITED STATES PATENT OFFICE

ISIDOR JACOBS, OF UNION CITY, NEW JERSEY

FASTENER

Application filed June 19, 1929. Serial No. 371,971.

My invention relates to fasteners arranged to be engaged or disengaged by the movement of a coupling device. The essentials of this class of fastener are two flexible strips each having one edge attachable to members to be fastened, engagement members along the other edge of each strip arranged in staggered relation to each other and a coupling guide which is usually a hollow shaped chamber. In operation, upward movement of the coupler causes the fastener members to be guided by its upper Y-shaped branches toward axial alignment and consequent engagement, and its downward motion reverses this operation and disengages the fastener members.

Among my objects is the improvement of the fastener members to afford the simplest and cheapest construction and provide the easiest, positive engagement, which will allow complete flexibility of the resulting juncture. Another object is to provide an improved means of support for the engaging members.

I attain these and other objects by the device illustrated in the accompanying drawings, in which—

Fig. 1 is a plan view of my fastener member drawn to an enlarged scale, showing also a sectional view of its supporting strip to which it is attached;

Fig. 2 is a sectional view thru A—A in Fig. 1, but omitting the support;

Fig. 3 shows the fastener member viewed from the engaging end;

Fig. 4 shows the fastener member in front elevation;

Fig. 5 shows the fastener viewed from its supporting end, with parts removed;

Fig. 6 is an end elevation of several members in engagement, illustrating how they may be transversely disaligned yet positively interlocked;

Fig. 7 is a front elevation of the fastener assembly with parts removed to clearly show the method of engagement of the fastener members;

Fig. 8 shows a sectional view of the supporting strip before the fastener member is clamped thereto, and Fig. 9 shows an elevation of same.

Similar numerals refer to similar parts thruout the several views.

In my preferred construction of the flexible supporting stringer, 10 is a fabric tape or webbed strip to which soutache 11 is sewed along one of its edges, as is clearly illustrated in Figs. 8 and 9, soutache 11 being a commercial product comprising two cords embraced by threads interlaced so as to form approximately the figure 8. If the not readily stretchable tape is used, it is preferred not to have the soutache preshrunk, but to leave the shrinking process until after it had been sewed to the tape. If webbing is used, which is readily stretchable longitudinally tho not laterally, the soutache may be preshrunk. The purpose thereof is to allow for the longitudinal expansion that takes place when the engaging members are clamped to the stringer.

The fastener members 12 have an engagement portion 13 and jaws 14, 14 which, before being clamped, are slightly spread apart. The soutache edge of the supporting strip is inserted between the jaws 14—14, the soutache cords are folded over the sides of the strip and the jaws are clamped tightly around the soutache 11 which assumes the shape indicated in Fig. 1.

When clamped about the soutache 11, the outer edges of the jaws 14—14 are parallel to each other and the overall width across these edges is greater than the overall width of the engagement portion 13. This protects the engagement portion 13 against distortion of its contour when a crushing force, such as a laundering iron, is applied, which only clamps the jaws more tightly around the soutache. These outer edges of the jaws 14 also take all the wear as the fastener coupling guide 15 is moved over the fastener members 12 in engaging or disengaging them also affording easier sliding of the coupling guide 15 because of he reduced contacting surface. To add to the strength of the inturned gripping portion 16, afford larger gripping surface and provide against cutting of the soutache, flat, upwardly projecting surfaces 16A are provided on each of the jaws 14. Sufficient gripping surface being allowed transversely, permits reduction longitudinally, which has the advantage of easier pivoting for the fastener member when it is tilted during engagement or disengagement. Indentations 17 are provided at the juncture of the jaws 14 so that the jaws may be separated with minimum strain to the fastener member. The indentations 17 are also rounded so that the outermost edge 18 of the member engaging therewith does not contact with this portion when transversely flexed.

The engaging means 13 of the fastener member 12 is a portion of a hollow sphere, whose inner and outer surfaces 19 and 20 respectively have equal radii of curvature $r, r$, but with their centers $o'$, displaced, preferably by an amount equal to the gage of the stock used. The hollow sphere 13 should be so formed that its outermost edge 18 is raised slightly above the horizontal axis 21 of the outer sphere, and the side edges 22—22 extend below this axis. This insures easy guidance of one member over the other while being engaged, reduces the angle of tilt required for engagement and provides ample engaging surface so that even when the fasteners are flexed either in the longitudinal or transverse directions or both, the members remain engaged. Also, upon continued flexing longitudinally, edge 22 will ride upon the back of the spherical surface 20, thereby closing the small clearance that may be allowed and thus, in abutting against the adjoining member, be prevented from further flexing.

Because of the equal contours of the inner and outer surfaces 19 and 20, free movement is allowed in all directions without any tendency for the fasteners to open. This tendency is prevalent among existing fasteners which, because of the oblong or angular contours of the engaging portions, afford edges about which the adjoining interlocking members may pivot, thereby affording opportunity for jamming or disengagement when similarly flexed. Such fasteners that have surfaces meeting in defined edges necessitate a quick rise on the part of the engaging member in surmounting these, whereas the spherical contour affords a gradually varying angle of ascent that lends itself to the smoothest operation,

Having thus described my invention, what I claim as new and desire to secure by Letters Patent is:

1. A fastener stringer comprising a stringer tape, a pair of cords, and an embracing tape about such cords in the form substantially of a figure 8 holding said cords together and attached on one side of said stringer tape at one edge thereof, said stringer tape edge being folded, and said cords forming a bead on each side of said folded edge and interlocking fastener members each having jaws embracing the bead on each side of the folded edge.

2. The process of forming a multiple interlocking fastener stringer consisting in sewing soutache, comprising a pair of cords and an embracing tape in the form of substantially a figure 8 holding said cords together, to one side of a stringer tape at one edge thereof, folding said stringer tape outwardly along the line of said sewing stitches, forming a beaded edge on opposite sides of said tape and clamping the jaws of interlocking fasteners about said beaded edge.

3. The process of forming a multiple interlocking fastener stringer, consisting in shrinking a fabric tape, securing soutache comprising a pair of cords and an embracing tape in the form of substantially a figure 8 holding said cords together, to one side of said tape at one edge thereof, subjecting the resulting stringer to shrinking and folding same outwardly with respect to said cords along the line of said soutache fastening, forming a beaded edge and clamping the jaws of interlocking fasteners about said beaded edge.

4. A fastener stringer having a stringer tape and a pair of cords, a band around said cords in the form substantially of a figure 8 and means for securing same adjacent the marginal edge of said tape, said edge of said tape folded and said cords forming beads at opposite sides thereof and fastener elements, each having a pair of jaws embracing said beaded portion.

In testimony whereof he hereunto affixes his signature.

ISIDOR JACOBS.